(12) United States Patent
DelloStritto et al.

(10) Patent No.: US 10,887,452 B2
(45) Date of Patent: Jan. 5, 2021

(54) SYSTEM ARCHITECTURE FOR FRAUD DETECTION

(71) Applicant: Verint Americas Inc., Alpharetta, GA (US)

(72) Inventors: James DelloStritto, Jordan, NY (US); Joshua Tindal Gray, Reston, VA (US); Ryan Thomas Schneider, Decatur, GA (US); Wade Walker Ezell, Woodstock, GA (US); Ajay Pandit, Herndon, VA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

(21) Appl. No.: 16/661,593

(22) Filed: Oct. 23, 2019

(65) Prior Publication Data

US 2020/0137221 A1    Apr. 30, 2020

Related U.S. Application Data

(60) Provisional application No. 62/750,473, filed on Oct. 25, 2018.

(51) Int. Cl.
| | | |
|---|---|---|
| *H04M 3/22* | (2006.01) | |
| *H04M 3/42* | (2006.01) | |
| *H04M 3/51* | (2006.01) | |
| *H04M 3/523* | (2006.01) | |

(52) U.S. Cl.
CPC ..... *H04M 3/2281* (2013.01); *H04M 3/42068* (2013.01); *H04M 3/5191* (2013.01); *H04M 3/5232* (2013.01)

(58) Field of Classification Search
CPC combination set(s) only.
See application file for complete search history.

(56) References Cited

U.S. PATENT DOCUMENTS

| | | | |
|---|---|---|---|
| 4,653,097 A | 3/1987 | Watanabe et al. | |
| 4,823,380 A | 4/1989 | Kohen et al. | |
| 4,864,566 A | 9/1989 | Chauveau | |
| 4,930,888 A | 6/1990 | Freisleben et al. | |
| 5,027,407 A | 6/1991 | Tsunoda | |
| 5,222,147 A | 6/1993 | Koyama | |
| 5,638,430 A | 6/1997 | Hogan et al. | |
| 5,805,674 A | 9/1998 | Anderson, Jr. | |

(Continued)

FOREIGN PATENT DOCUMENTS

| | | |
|---|---|---|
| DE | 202008007520 | 8/2008 |
| EP | 0598469 | 5/1994 |

(Continued)

OTHER PUBLICATIONS

Search Report, dated Mar. 3, 2020, received in connection with EP Patent Application No. 19205424.5.

(Continued)

*Primary Examiner* — Phung-Hoang J Nguyen
(74) *Attorney, Agent, or Firm* — Meunier Carlin & Curfman LLC

(57) ABSTRACT

An architecture for assessing and identifying fraudulent contact with client contact systems, such as IVR, includes threshold and machine learning scoring and filtering of calls based on these criteria. The criteria may include behavioral, situational and reputational scoring.

16 Claims, 11 Drawing Sheets

(56) References Cited

U.S. PATENT DOCUMENTS

| | | | |
|---|---|---|---|
| 5,907,602 A | 5/1999 | Peel et al. | |
| 5,946,654 A | 8/1999 | Newman et al. | |
| 5,963,908 A | 10/1999 | Chadha | |
| 5,999,525 A | 12/1999 | Krishnaswamy et al. | |
| 6,044,382 A | 3/2000 | Martino | |
| 6,145,083 A | 11/2000 | Shaffer et al. | |
| 6,266,640 B1 | 7/2001 | Fromm | |
| 6,275,806 B1 | 8/2001 | Pertrushin | |
| 6,427,137 B2 | 7/2002 | Pertrushin | |
| 6,480,825 B1 | 11/2002 | Sharma et al. | |
| 6,510,415 B1 | 1/2003 | Talmor et al. | |
| 6,587,552 B1 | 7/2003 | Zimmerman | |
| 6,597,775 B2 | 7/2003 | Lawyer et al. | |
| 6,915,259 B2 | 7/2005 | Rigazio | |
| 7,006,605 B1 | 2/2006 | Morganstein et al. | |
| 7,039,951 B1 | 5/2006 | Chaudhari et al. | |
| 7,054,811 B2 | 5/2006 | Barzilay | |
| 7,106,843 B1 | 9/2006 | Gainsboro et al. | |
| 7,130,800 B1 | 10/2006 | Currey et al. | |
| 7,158,622 B2 | 1/2007 | Lawyer et al. | |
| 7,212,613 B2 | 5/2007 | Kim et al. | |
| 7,299,177 B2 | 11/2007 | Broman et al. | |
| 7,386,105 B2 | 6/2008 | Wasserblat | |
| 7,403,922 B1 | 7/2008 | Lewis et al. | |
| 7,539,290 B2 | 5/2009 | Ortel | |
| 7,657,431 B2 | 2/2010 | Hayakawa | |
| 7,660,715 B1 | 2/2010 | Thambiratnam | |
| 7,668,769 B2 | 2/2010 | Baker et al. | |
| 7,693,965 B2 | 4/2010 | Rhoads | |
| 7,778,832 B2 | 8/2010 | Broman et al. | |
| 7,822,605 B2 | 10/2010 | Zigel et al. | |
| 7,908,645 B2 | 3/2011 | Varghese et al. | |
| 7,940,897 B2 | 5/2011 | Khor et al. | |
| 8,036,892 B2 | 10/2011 | Broman et al. | |
| 8,073,691 B2 | 12/2011 | Rajakumar | |
| 8,112,278 B2 | 2/2012 | Burke | |
| 8,145,562 B2 | 3/2012 | Wasserblat et al. | |
| 8,253,797 B1 | 8/2012 | Maali et al. | |
| 8,311,826 B2 | 11/2012 | Rajakumar | |
| 8,510,215 B2 | 8/2013 | Gutierrez | |
| 8,537,978 B2 | 9/2013 | Jaiswal et al. | |
| 9,001,976 B2 | 4/2015 | Arrowood | |
| 10,477,012 B2* | 11/2019 | Rao | H04M 3/5175 |
| 2001/0026632 A1 | 10/2001 | Tamai | |
| 2002/0022474 A1 | 2/2002 | Blom et al. | |
| 2002/0099649 A1 | 7/2002 | Lee et al. | |
| 2003/0009333 A1 | 1/2003 | Sharma et al. | |
| 2003/0050780 A1 | 3/2003 | Rigazio | |
| 2003/0050816 A1 | 3/2003 | Givens et al. | |
| 2003/0063133 A1 | 4/2003 | Foote et al. | |
| 2003/0097593 A1 | 5/2003 | Sawa et al. | |
| 2003/0147516 A1 | 8/2003 | Lawyer et al. | |
| 2003/0203730 A1 | 10/2003 | Wan et al. | |
| 2003/0208684 A1 | 11/2003 | Camacho et al. | |
| 2004/0029087 A1 | 2/2004 | White | |
| 2004/0105006 A1 | 6/2004 | Lazo et al. | |
| 2004/0111305 A1* | 6/2004 | Gavan | G06Q 20/401 706/47 |
| 2004/0131160 A1 | 7/2004 | Mardirossian | |
| 2004/0143635 A1 | 7/2004 | Galea | |
| 2004/0164858 A1 | 8/2004 | Lin | |
| 2004/0167964 A1 | 8/2004 | Rounthwaite et al. | |
| 2004/0169587 A1 | 9/2004 | Washington | |
| 2004/0203575 A1 | 10/2004 | Chin et al. | |
| 2004/0240631 A1 | 12/2004 | Broman et al. | |
| 2004/0257444 A1 | 12/2004 | Maruya et al. | |
| 2005/0010411 A1 | 1/2005 | Rigazio | |
| 2005/0043014 A1 | 2/2005 | Hodge | |
| 2005/0076084 A1 | 4/2005 | Loughmiller et al. | |
| 2005/0125226 A1 | 6/2005 | Magee | |
| 2005/0125339 A1 | 6/2005 | Tidwell et al. | |
| 2005/0185779 A1 | 8/2005 | Toms | |
| 2005/0273442 A1 | 12/2005 | Bennett et al. | |
| 2006/0013372 A1 | 1/2006 | Russell | |
| 2006/0106605 A1 | 5/2006 | Saunders et al. | |
| 2006/0107296 A1 | 5/2006 | Mock et al. | |
| 2006/0149558 A1 | 7/2006 | Kahn | |
| 2006/0161435 A1 | 7/2006 | Atef et al. | |
| 2006/0212407 A1 | 9/2006 | Lyon | |
| 2006/0212925 A1 | 9/2006 | Shull et al. | |
| 2006/0248019 A1 | 11/2006 | Rajakumar | |
| 2006/0251226 A1 | 11/2006 | Hogan et al. | |
| 2006/0282660 A1 | 12/2006 | Varghese et al. | |
| 2006/0285665 A1 | 12/2006 | Wasserblat et al. | |
| 2006/0289622 A1 | 12/2006 | Khor et al. | |
| 2006/0293891 A1 | 12/2006 | Pathuel | |
| 2007/0041517 A1 | 2/2007 | Clarke et al. | |
| 2007/0071206 A1 | 3/2007 | Gainsboro et al. | |
| 2007/0074021 A1 | 3/2007 | Smithies et al. | |
| 2007/0100608 A1 | 5/2007 | Gable et al. | |
| 2007/0124246 A1 | 5/2007 | Lawyer et al. | |
| 2007/0244702 A1 | 10/2007 | Kahn et al. | |
| 2007/0280436 A1 | 12/2007 | Rajakumar | |
| 2007/0282605 A1 | 12/2007 | Rajakumar | |
| 2007/0288242 A1 | 12/2007 | Spengler | |
| 2008/0010066 A1 | 1/2008 | Broman et al. | |
| 2008/0114612 A1 | 5/2008 | Needham et al. | |
| 2008/0181417 A1 | 7/2008 | Pereg et al. | |
| 2008/0195387 A1 | 8/2008 | Zigel et al. | |
| 2008/0222734 A1 | 9/2008 | Redlich et al. | |
| 2009/0033519 A1 | 2/2009 | Shi et al. | |
| 2009/0046841 A1 | 2/2009 | Hodge | |
| 2009/0059007 A1 | 3/2009 | Wagg et al. | |
| 2009/0106846 A1 | 4/2009 | Dupray et al. | |
| 2009/0119106 A1 | 5/2009 | Rajakumar et al. | |
| 2009/0147939 A1 | 6/2009 | Morganstein et al. | |
| 2009/0247131 A1 | 10/2009 | Champion et al. | |
| 2009/0254971 A1 | 10/2009 | Herz et al. | |
| 2009/0304374 A1 | 12/2009 | Fruehauf et al. | |
| 2009/0319269 A1 | 12/2009 | Aronowitz | |
| 2010/0114744 A1 | 5/2010 | Gonen | |
| 2010/0228656 A1 | 9/2010 | Wasserblat et al. | |
| 2010/0303211 A1 | 12/2010 | Hartig | |
| 2010/0305946 A1 | 12/2010 | Gutierrez | |
| 2010/0305960 A1 | 12/2010 | Gutierrez | |
| 2010/0329546 A1 | 12/2010 | Smith | |
| 2011/0004472 A1 | 1/2011 | Zlokarnik | |
| 2011/0026689 A1 | 2/2011 | Metz et al. | |
| 2011/0069172 A1 | 3/2011 | Hazzani | |
| 2011/0191106 A1 | 8/2011 | Khor et al. | |
| 2011/0255676 A1 | 10/2011 | Marchand et al. | |
| 2011/0282661 A1 | 11/2011 | Dobry et al. | |
| 2011/0282778 A1 | 11/2011 | Wright et al. | |
| 2011/0320484 A1 | 12/2011 | Smithies et al. | |
| 2012/0053939 A9 | 3/2012 | Gutierrez et al. | |
| 2012/0054202 A1 | 3/2012 | Rajakumar | |
| 2012/0072453 A1 | 3/2012 | Guerra et al. | |
| 2012/0253805 A1 | 10/2012 | Rajakumar et al. | |
| 2012/0254243 A1 | 10/2012 | Zeppenfeld et al. | |
| 2012/0263285 A1 | 10/2012 | Rajakumar et al. | |
| 2012/0284026 A1 | 11/2012 | Cardillo et al. | |
| 2013/0163737 A1 | 6/2013 | Dement et al. | |
| 2013/0197912 A1 | 8/2013 | Hayakawa et al. | |
| 2013/0253919 A1 | 9/2013 | Gutierrez et al. | |
| 2013/0283378 A1* | 10/2013 | Costigan | G06K 9/00355 726/23 |
| 2013/0300939 A1 | 11/2013 | Chou et al. | |
| 2015/0055763 A1 | 2/2015 | Guerra et al. | |
| 2018/0075454 A1* | 3/2018 | Claridge | G06Q 20/4016 |

FOREIGN PATENT DOCUMENTS

| | | |
|---|---|---|
| JP | 2004-193942 | 7/2004 |
| JP | 2006-038955 | 9/2006 |
| WO | 2000/077772 | 12/2000 |
| WO | 2004/079501 | 9/2004 |
| WO | 2006/013555 | 2/2006 |
| WO | 2007/001452 | 1/2007 |
| WO | 2010/116292 | 10/2010 |

OTHER PUBLICATIONS

3GPP TS 24.008 v3.8.0, "3rd Generation Partnership Project; Technical Specification Group Core Network; Mobile radio inter-

(56) References Cited

OTHER PUBLICATIONS face layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.
Cohen, I., et al., "Spectral Enhancement by Tracking Speech Presence Probability in Subbands," Proc. International Workshop in Hand-Free Speech Communication (HSC'01), 2001, pp. 95-98.
ETSI TS 102 232-5 v2.1.1, "Lawful Interception (LI); Handover Interface and Service Specific Details (SSD) for IP delivery; Part 5: Service-specific details for IP Multimedia Services," Feb. 2007, 25 pages.
ETSI TS 102 657 v1.4.1, "Lawful Interception (LI); Retained data handling; Handover interface for the request and delivery of retained data," Dec. 2009, 92 pages.
Girardin, Fabien, et al., "Detecting air travel to survey passengers on a worldwide scale," Journal of Location Based Services, 26 pages.
Hayes, M.H., "Statistical Digital Signal Processing and Modeling," J. Wiley & Sons, Inc., New York, 1996, 200 pages.
Lailler, C., et al., "Semi-Supervised and Unsupervised Data Extraction Targeting Speakers: From Speaker Roles to Fame?" Proceedings of the First Workshop on Speech, Language and Audio in Multimedia (SLAM), Marseille, France, 2013, 6 pages.
Meyer, Ulrike, et al., "On the Impact of GSM Encryption and Man-in-the-Middle Attacks on the Security of Interoperating GSM/UMTS Networks," IEEE, 2004, 8 pages.
Schmalenstroeer, J., et al., "Online Diarization of Streaming Audio-Visual Data for Smart Environments," IEEE Journal of Selected Topics in Signal Processing, vol. 4, No. 5, 2010, 12 pages.
Strobel, Daehyun, "IMSI Catcher," Seminararbeit Ruhr-Universität Bochum, Chair for Communication Security, Prof. Dr.-Ing. Christof Paar, Jul. 13, 2007, 28 pages.
Vedaldi, Andrea, "An implementation of SIFT detector and descriptor," University of California at Los Angeles, 7 pages.

\* cited by examiner

SYSTEM ARCHITECTURE FOR FRAUD DETECTION

This application is a non-provisional patent application claiming priority to Provisional Patent Application Ser. No. 62/750,473, filed Oct. 25, 2018, which is hereby incorporated by this reference in its entirety as if fully set forth herein.

BACKGROUND OF THE INVENTION

Field of the Invention

This invention relates generally to a system architecture as an omnichannel fraud solution not geographically limited.

Background

According to the Identity Theft Resource Center, there were 781 tracked data breaches in 2015 where consumer data was stolen. There are many more breaches that go undetected or unreported. 338 of these breaches resulted in over 164 million social security numbers being stolen. Credit card accounts can be closed, but social security numbers provide an ongoing opportunity for fraudulent activity. In 2016 the number of breaches increased to 1,091 and there have already been over 1,000 in 2017 including the Equifax breach where 143M social security numbers were compromised. According to Javelin, losses attributable to identity theft topped $16B.

Fraudsters take the stolen data and systematically attack the consumer, enterprises and government entities through the contact center, Interactive Voice Response (IVR) systems, and other self-service channels. The IVR provides the means for a fraudster to access account information in anonymity without facing any interrogation by an agent.

In a 2016 Aite Group study, 78% of financial services executives indicated that fraud in the contact center is on the increase and 17% indicated that they didn't know, likely because they don't have the processes in place to identify the fraud in the call center let alone prevent it. Account Takeover (ATO) fraud accounts for 28% of all identity theft fraud in financial services and has a 10% CAGR. Fraudulent activity is so prevalent in the contact center that Aite says, "Account Takeover is so commonly enabled in the contact center that it should be renamed the cross-channel fraud enablement channel."

SUMMARY OF THE INVENTION

In accordance with the purpose(s) of this invention, as embodied and broadly described herein, this invention, in one aspect, relates to a method of detecting fraud in a client contact system including receiving a contact from a user, the contact corresponding to event data, the event data including at least one of a channel type and an identifier; and checking the event data against at least one criteria to determine a risk associated with the event data, wherein at least one of the criteria comprises at least one of behavior criterion, situation criterion and reputation criterion.

In another aspect, the invention relates to An architecture for fraud detection in an interactive voice response system, that includes a client system that interacts with a user on a channel; a Shared Composite Application Programming Interface (API) that receives event data from the client system; a fraud ingestion service ingestion processor that receives the event data from the shared composite API; a fraud detail record topic that receives the event data from the fraud ingestion service; a fraud service aggregator that receives the event data from the fraud detail record topic, the fraud service aggregator in communication with a fraud record service for comparing the event data to prior event data for providing to a scoring topic, the scoring topic providing at least one a plurality of checks on the event data to determine if the event data represents a fraud risk.

BRIEF DESCRIPTION OF THE DRAWINGS

The accompanying drawings, which are incorporated in and constitute a part of this specification, illustrate (one) several embodiment(s) of the invention and together with the description, serve to explain the principles of the invention.

DETAILED DESCRIPTION

Figure 1:
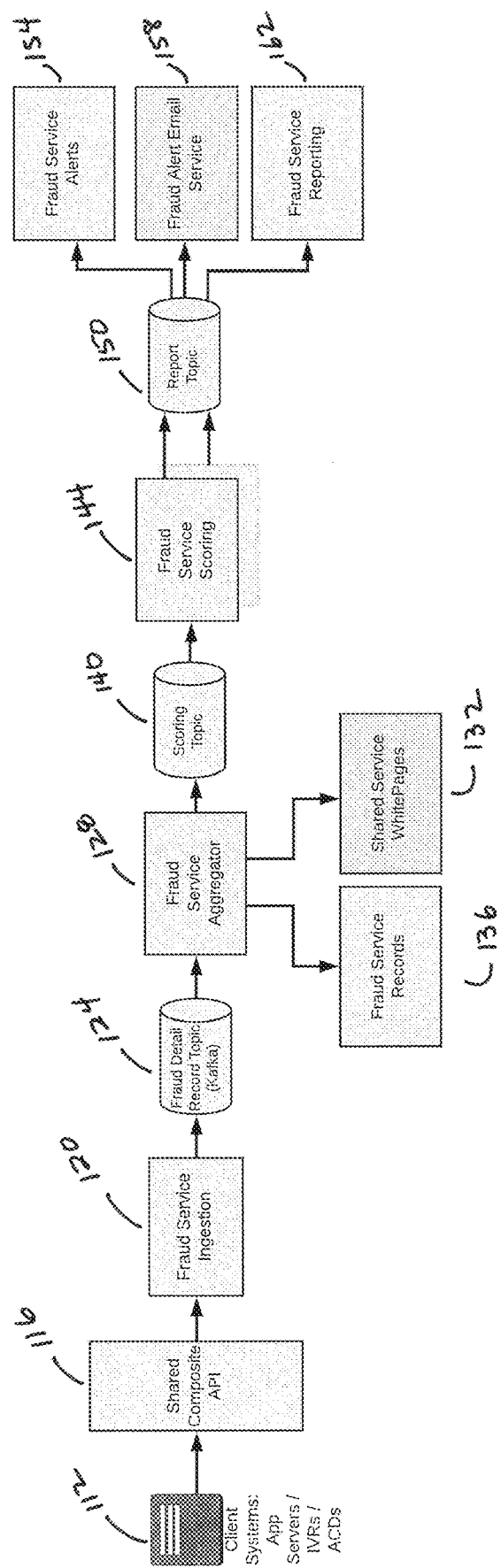
FIG. 1 shows an upper level architecture of a system according to principles described herein.

The present invention may be understood more readily by reference to the following detailed description of preferred embodiments of the invention and the Examples included therein and to the Figures and their previous and following description.

In this specification and in the claims which follow, reference will be made to a number of terms which shall be defined to have the following meanings: Reference will now be made in detail to the embodiment(s) of the invention, an example(s) of which is [are] illustrated in the accompanying drawings. Wherever possible, the same reference numbers are used throughout the drawings to refer to the same or like parts.

The intent of this disclosure is a fraud solution that can ingest data from a variety of 3rd party systems, analyze the data in real-time and take prescribed actions based on the perceived threat level. The solution is intended as an omnichannel fraud solution and the architecture has no geographical restrictions.

The use of artificial intelligence (AI) in fraud detection holds major promise. Keeping fraud at bay is an ever-evolving battle in which both sides are adapting as quickly as possible. The subject of this disclosure involves data analysis and machine learning in a customizable gated process that looks at behavior, reputation, and situational analysis to determine how far outside the norm a user is who is interacting with the system.

Behavior analysis looks at how users are interacting with the system and reputation analysis is a historical account of how an individual has used the system in the past.

Lastly, situational analysis is where the caller is (geography), the time of day and other situational data points. In the data analysis and in machine learning, some or all the data processed depends on how we intend to interact with the system. We use supervised machine learning and statistics—to discover new rules and patterns and subsequently unsupervised machine learning to detect outliers that are or could be potential threats.

The goal of this system is the combination of data mining and statistics allowing the before-mentioned inputs to be modeled in a way allowing the detection of aberrant or uncharacteristic system use suspected as fraud. Applied to machine learning, the before-mentioned model is used in the scoring and decisions process predicting to a level of certainty if the combined behavior, situation, and reputation are outside the norm (outliers). In the disclosed system, data points within the models can be used strategically to control the flow of data. IVR, Intelligent Virtual Assistant (IVA) and other systems can at times produce millions of records per minute each of which can be checked in phases and promoted for further analysis in ever increasing levels of computation. The decision on what to check is dependent on how the system is used and therefore the present disclosure includes a configurable mechanism for grouping and prioritizing how the model(s) can be chained in a multi-phase gating process used to check and promote further analysis. What this allows for is an intelligent processing pipeline using simple checks and machine learning to reason about data points. As IVR and IVA apps largely differ from one domain to the next being able to configure behavior and reputation data points and how they are checked and combined is also a subject of this disclosure. The presently disclosed system allows for data points to be combined in a configuration step based on the domain model and then used to control the flow of a high-volume system that will eventually filter data down propagating only interactions that are considered risky. Those practiced in the art will also realize that the subject and application of this system and architecture is not limited for phone-based systems. The same principles can apply to any high-volume transaction-based system including Internet Protocol (IP) addresses, emails, and any other user interaction systems.

A channel address is a generic term used to refer to a point of contact made by an individual. The following represents channel addresses that are ingress points:

Automatic Number Identification (ANI)—Origination Phone Number (for IVR and direct calls)
IP address—Origination internet protocol address
Session Initiation Protocol (SIP) address—URI that addresses the specific telephone extension.
Email Address FIG. 1 shows an upper level architecture of a system according to principles described herein. In FIG. 1, the data moves from the left to the right. As it moves through the pipeline it is assessed in multiples stages using, security checks, format checks, conditionals, data aggregation for enriching events with context data and finally thresholds check as well as more advanced Machine Learning Techniques.

Client systems 112 that interact with a user on a channel (e.g. phone, IP, email, and others) send event data to a Shared Composite API 116. Shared Composite API 116 is a secured API via a token. If the token is valid it is forwarded to the Fraud Service ingestion Fraud Service ingestion 120 checks and can correct the format of the data (contract). If valid the event is forwarded to the record topic. The Fraud Service Ingestion may include a memory and CPU to perform these tasks.

The Fraud Detail Record Topic 124 is a pub/sub high speed data pipe. Any service can subscribe to the events on the pipe. In this case for events there is currently only one however it is not limited to one. The fraud service aggregator is the next step in the process.

Fraud Service Aggregator 128 picks up the event from the published topic and augments the event with additional context data. It then checks the event channel address against a white list 132 and black list and the augmented event is forwarded on to the scoring topic 140. The Fraud Service Aggregator may also look up other information about an ANI, for example, how many contacts from that ANI in a predetermined period of time, such as over a 30, 60, or 90-day period. Information may be provided by the Fraud Service Aggregator accessing Fraud Service Records 136

The scoring topic 140 is subscribed to by one to many scoring services, some of which may be simple threshold checks while others are Machine Learning (ML) based. Depending on the channel address in use one or many scoring services are used to check for multiple broad or very specific attack vectors. Extending the process of a high-volume system to multiple parallel and replicated services assists in allowing the events that need actions (are identified as suspect) are forwarded on to the scoring topic 140. The scoring processes can be simple threshold checks or more advanced ML based solutions. Some of the categories include:

Simple thresholds checks. E.g. how many times has a caller attempted to access the systems and how many accounts have they accessed.
What type of behavior do they exhibit over short periods of access or over longer terms?
How do they deviate from the expected pattern of normal use?
Situational . . . what channel address (IP or Number) are they calling from . . . what is the history of that channel address.
Situational . . . where are they calling from. Is the location of the caller suspect or from a location where services and user normally call from?
Situational . . . what phone carrier or internet service provider (ISP) is being used to interact with the system? Is there risk associated with the carrier/ISP?
Situational . . . is the caller manipulating SIP headers to falsify ("spoof") the number they are calling from?

Based on a potentially large list of factors from simple counts to more complicated ML based predictions a level of threat is used to determine if the call should be forwarded for analysis.

Beyond the fraud scoring service 144 are actionable receivers used to engage with a fraud analyst or systems that are monitoring for fraud. Scoring services 144 use the Scoring topic to publish suspect events to a record topic 150 and series of reporters, such as Fraud Service Alerts 154, Fraud Alert Emails 158 and/or other Fraud Service Reporting mechanisms 162.

Reporters are any service used to notify on a suspicious or potentially fraudulent channel address. These can include Short Message Service (SMS), email, an API used by other services or web dashboards, and lastly the report service contains extensive details about the event and any scoring outcomes provided by the one or many scoring services. The report service 150 is used with a Fraud dashboard that allows an analyst or other user to monitor the system for fraud in near real-time.

In order to support the broad categories of data from many channels that change a flexible and extensible pipeline approach is used to filter down a very large number of events to support a near real-time approach to capturing users that intend fraudulent activity. By pipelining the data and performing data aggregation across multiple service we gain the ability to add additional data and services for analysis without stopping the pipeline.

Figure 2:
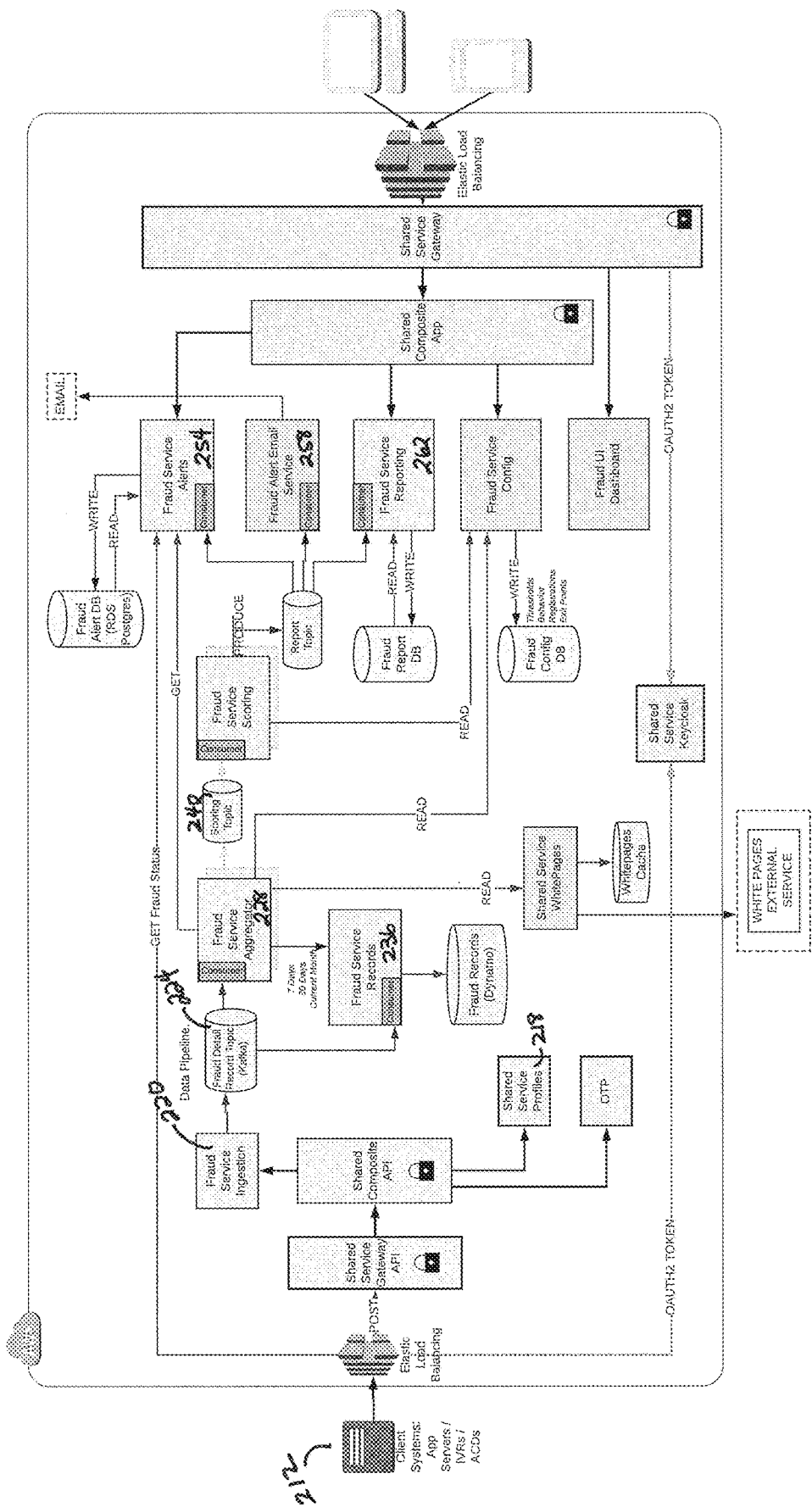
FIG. 2 illustrates a detailed architecture according to principles described herein.

FIG. 2 illustrates a detailed architecture according to principles described herein. The aim of the illustrated architecture (FIG. 2) and the following description of modules contained within are used to monitor and assess individual 'channel addresses' from which Fraudsters conduct attacks.

IVR and Other 212: Channel addresses that can produce call interaction details that include ANI (automatic number identification), IP addresses, SIP addresses, emails, from which can be acquired a standardized yet extensible set of data for analysis.

Fraud Composite API and Composite APP 216: Both composite components act as secured routing for services that are directly accessible to end users.

Shared Service Profile 218: Provides an API to return an immediate snapshot of a channel address that can be used by an external system to make immediate decisions on how to handle a caller on a specific channel address. A score based on a combination of immediate situational analysis and prior behavioral analysis will be calculated and returned to the external system.

Fraud Service Ingestion 220: A contractual API for consuming data from channel addresses. That include but not limited to the following:

```
{
    "accounts": [{
        "accountDisplay": "string",
        "accountHash": "string",
        "authValue": "string",
        "contextData": [{
            "name": "string",
            "value": "string"
        }],
        "countFailedAuth": 0
    }],
    "actionTaken": "string",
    "aniIIDigits": 0,
    "appLogId": "string",
    "appName": "string",
    "application": "string",
    "callCompletionCode": "string",
    "channel": "string",
    "channelAddress": "string",
    "customerId": "string",
    "division": "string",
    "dnis": "string",
    "duration": 0,
    "exitPoint": "string",
    "ipAddress": "string",
    "organization": "string",
```

-continued

```
    "sipHeader": [{
        "field": "string",
        "value": "string"
    }],
    "startTime": "2018-09-19T10:05:00",
    "voiceBiometrics": [{
        "event": "string",
        "personId": "string",
        "personType": "string",
        "score": 0,
        "voiceprintId": "string"}]
```

The ingestion service is a contract-based Representational State Transfer (REST) API containing a high-speed pub-sub data producer that can quickly publish the data out to a topic that is subscribed to by listening consumers that store and aggregate the data.

Fraud Detail Record Topic 224: A messaging topic on a high-speed pub-sub data pipe used by the 'Fraud Service Ingestion' to distribute channel address events to multiple endpoints for processing. In the attached drawing databases and the 'aggregation' microservice receive events. There are multiple receivers.

The Fraud Service Records Database (DB) 236 stores the event data.

The Fraud Service Aggregator 228 collects past events from 'Fraud Service Records' (reputation), the behavior and situational data. The aggregator may also collect extended data related to the caller or context of the call It then uses machine learning and simple checks to determine if the further analysis is required.

Fraud Service Records and DB 236: Microservice and database storing all ingested channel address events. Running record of all events received and processed. To support high throughput and the ability to sort and search events key attributes in the received data are used to generate a unique key that is indexed and used to quickly sort and count events. Data is partitioned using a unique hash key that is generated by combining the following:

Channel Type,
Channel Address
and the app source

Data is further sorted by event date. The benefit of partitioning on a combined single unique key is increased search and sort performance.

Fraud Aggregator 228: Aggregates data from events via 'Fraud Records Service' as well as other sources. This microservice collates and collects data that is used initially for pre-screening. During prescreen data points can be checked to determine if the channel address is known or trusted otherwise it will be published to the scoring topic for further analysis. This service collects the before mentioned behavioral, situational, and reputation against the channel address.

High Level Data Categories
Situational
Attributes about the channel address including whitelisting and blacklisting, location of the call.
Reputation
Historical reputation . . . e.g. has this channel been seen recently.
Behavioral
Represents the caller and channel address behavior. These attributes are represented as counts or volumes e.g. how many times a user access the system. How many accounts the channel address or caller accesses.

Conditional Processing

The aggregator is the first-round screener for a channel address. For example, if the ANI is whitelisted (good) processing will stop.

Score Topic 240: Used by the Aggregator to send fraud records to scoring services.

Fraud Service Scoring 244: A service or services that receive aggregated records to score. The received record contains the channel address aggregate report. The Scoring module itself can employ threshold based and/or machine learning for processing the record. Each service is configurable leveraging 1 or many data points. Multiple modes can run simultaneously. Each micro-service scoring module can be replicated as demand requires. For example: With average scoring speed of 25 milliseconds (ms), one scoring service can handle 40 requests/second, 2400/minute, 144,000/hour. Running 10 scoring services can handle 144,000*10=1,400,000 requests/hour. Any combination of scoring service types can be combined to improve the performance throughput and the accuracy of the detection.

PPROCESING—The scoring service uses conditional checking to determine whether a channel address should continue to be processed. If conditional checking determines the channel is risky behavioral processing using unsupervised learning (ML) will run further analyzing the channel address caller behavior.

STEP 1 Situational/Conditional Processing: The scoring service may employ simple conditionals . . . e.g.

if (blacklist==true) {run a full analysis report and automatically generate a report and alert.}.

In this simple conditional the channel address has been marked as blacklisted. Meaning it has been determined that the user of the channel address is a fraudster therefore the report will be processed. Also . . . if feedback responses are available the scoring service may halt the process and notify the external system that the address is blacklisted and redirect the caller to an agent (see 'Active call analysis' later in the description).

Other conditionals may also be configured. For example:

if (country==Russia or country X or country Y) {continue processing report . . . }

In this case the algorithm is effectively looking for specific conditionals that are unlikely or suspect. For example, if the operating country is U.S. with U.S. based customers it is very unlikely that a caller from Russia is a customer. Conditionals can include the carrier as well. For example, if the carrier is Verizon it is less likely fraud as fraudsters will prefer more obscure carriers to carry out attacks.

There are multiple conditionals that can be configured to either stop the reporting process or to ensure it is executed. One or many conditionals may be used to determine if a channel address should be processed. A configuration screen is used in this system to allow conditionals to be enabled/disabled and loaded with match lists for conditionals with many targets e.g. countries. Conditionals can also be weighted and use in a combined manner to score the overall situation which in turn is used to stop or move the process forward to the behavioral phase. (see section on Scoring (ANI and API)).

STEP 2 Behavioral Processing Analysis with ML Standard Deviation: standard deviation is the simple measure of how spread out numbers are. The formula is defined as follows.

$$\sigma = \sqrt{\frac{1}{N-1}\sum_{t=1}^{N}(x_t - \bar{x})^2}$$

Looking primarily at the behaviors we can detect when a behavior is outside the norm. For example, looking at a sample set of data over a three-month period and calculating the standard deviation we find that most channel addresses call into the system at a calculated mean of 20 times (20 calls from the same number or channel address in that period). The standard deviation is the space around the mean where channel address volumes fall and can consider expect behavior.

Figure 11:
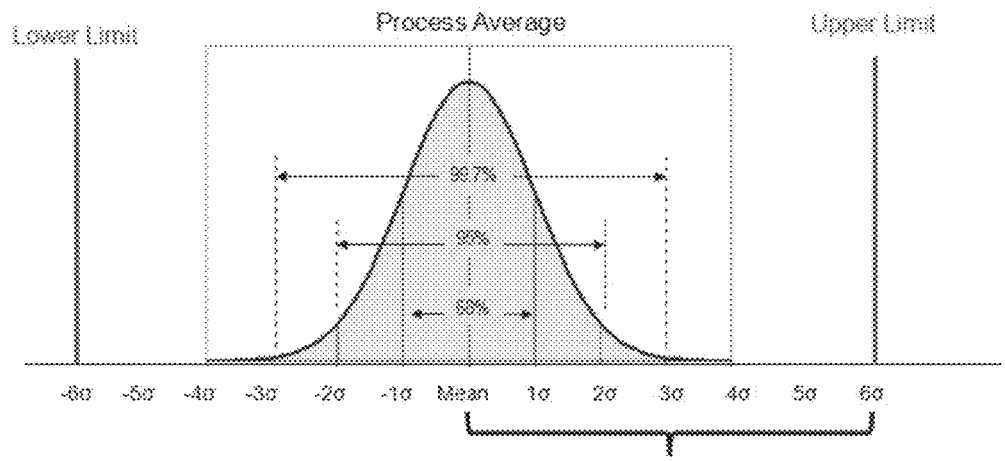
FIG. 11 is a conceptual graphic showing standard deviation for a sample set of data.

In the conceptual graphic in FIG. 11, it can be seen that 68% of all channel address volumes fall within 1 standard deviation of the mean. Depending on the sample size and the behavior characteristic, the standard deviation can be used to determine if the report should be marked as potential fraud. In this model, for example, the channel address call volume is configured to be reported as a potential fraud case if the volume is outside +−3 standard deviation (−σ) from the mean. If the call falls within 1 standard deviation the report is not generated, and the process ends. For high volume systems to be efficient only those cases that fall outside a configured standard deviation are processed. Channel address access-volumes or call-volumes are only one behavior to consider. The number of accounts a channel address accesses is also an indicator of a Fraudster trying to access several accounts.

Depending on the fraudster and the application in question any behavior captured could be applied to standard deviation processing. Each behavior can be configured based on period and simple calculation or training step where a sample set is taken and analyzed. The resultant analysis can be used to determine how many standard deviations away from the mean a behavior is to be consider for report processing.

Pooled Standard Deviation and other methods . . . . In some cases, behaviors are related, and an average standard deviation can be applied across multiple behaviors. Pooled standard deviation leverages combined averaged standard deviation across multiple behavioral inputs.

Random forests and Random Cut Forests algorithms can also be used however it should be noted that a single optimal decision tree is not likely as small variations in the data might result in a completely different tree being generated. IVR and IVA workflows from one customer/domain to another can vary greatly so it is likely that for each a new tree would have to generated. Decision trees can still be helpful, and the problem can be mitigated by using decisions trees within an ensemble where some trees are standardized trees common across all workflows, where others are specific to the domain in question.

A note about behaviors: The approach a fraudster takes is often a brute force strategy in which we see many calls across multiple accounts. Another approach is for multiple fraudsters to collaborate to simultaneously attack one or more specific accounts from different channel addresses. These characteristics manifest with positive deviations from the mean . . . negative deviations or low volume attacks may also take place where more patient fraudsters conduct attacks using multiple channels with access periods that go beyond 7 or 30 days. Standard deviation allows us to see both high call volume attacks as well as long period attacks. Low volume outliers might be considered and analyzed as potential attack vectors.

Using standard deviation and simple graphing, a user can visualize the behaviors and set thresholds against the mean. Using standard deviation across all behavior counts provides an intuitive interface requiring limited skill to visualize, understand, and configure how far outside the norm (error)

a value must be to be considered risky and processed further. Most of the attributes classified as behaviors are counts. E.g. number of calls per month, number of accounts accessed by one channel address, number of times a channel address/caller exits the system in a similar place, number of times a channel address fails an authentication, number of times a channel address/user attempts a re-pin.

Figure 12:
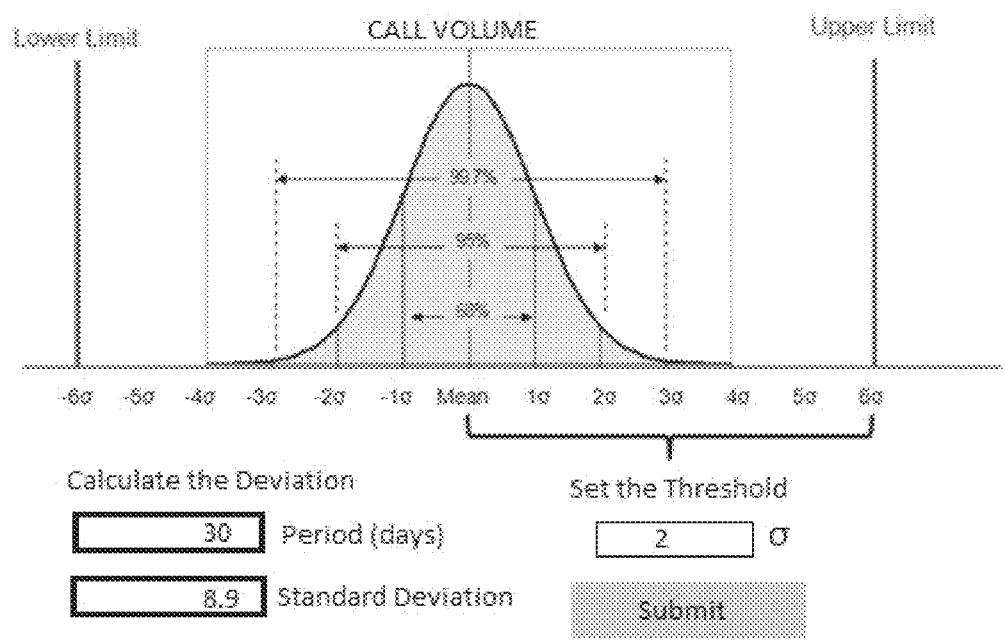
FIG. 12 illustrates a sample configuration screen for providing the ability to set a standard deviation for threshold testing.

In an example embodiment a sample configuration screen might look as illustrated in FIG. 12.

In the present example, a training data set is loaded, the period of the calculation is set, and the deviation displayed. This User Interface (UI) allows an ability to set the standard deviation for threshold testing in the live running process. In this case call volumes greater than two standard deviations away from the mean would be processed.

Additionally, and as mentioned prior . . . . A graduated scale could also be set indicating low, elevated, and high-risk channel addresses using a range of standard deviation. (see fraud service config)

Standard deviation provides a compelling visual and clues on how to set threshold markers that can inform the process on when to proceed with further report processing.

Process Recap

Starting from aggregation and running all the way through to the behavior processing, a profile or case is being built and decisions being made along the way that can quickly weed-out those channel addresses that are unlikely to be fraudulent. Using a series of graduated techniques starting with simple conditions all the way up to the use of unsupervised ML, this system allows a user to build a case and put in place distributed processing and decision points capable of operating efficiently in high traffic systems.

Fraud Config DB Contains score weights and score configuration thresholds use to determine if a channel address and events are suspect and thus if the channel address should be broadcast on the Report Topic for consumption in dashboard or notification services. The configuration is cached for performance and is long lived (e.g. cached items live for long periods of time). If the thresholds are changed by the user, they are auto flushed so they are retrieved fresh the next time a channel address is scored.

Shared Phone Lookup Service

An interface to an external system that can check validity on a given channel address and when combined with other scores, helps to determine combined level of threat for the channel address.

Report Topic

Used by the Fraud Service Scoring modules to send identified fraud cases to a series of services for reporting. There are currently 4 risk levels for fraud based on configured thresholds. Only low, elevated and high-risk channel reports are forwarded.

"no risk",
  "low",
  "elevated"
  "high"

Fraud Alert Email

Service listening on the 'Fraud Score' topic for positively identified fraud events for a given channel address. When received notifications of a fraud event are sent to configured email(s).

Fraud Service Alerts

A service listening for fraud events. The 'Fraud Service Alerts' service will store the event and notify a web application dashboard of a new or updated channel address identified as a fraud risk.

Fraud Service Reporting

A service listening for fraud events. The Fraud Service Reporting will store newly received and updated scores for a channel address. Reports contain a more comprehensive view of channel address that are suspect and are used by the report dashboard to display a more comprehensive via of the analysis.

Fraud Report DB

Contains the reports for a given identified channel address.

Fraud Service Config

A Service API used to capture and deliver threshold and standard deviation weights to a UI for examination and modification.

Fraud UI Config

A web user interface allowing configuration settings for a particular customer and app to be set. The config dashboard allows users to update thresholds for rules in fraud detection.

Fraud Config DB

Stores configuration thresholds and weights for rules to be used during processing of channel addresses.

Fraud Dashboard UI

A web user interface showing fraud alerts and status of newly received calls/connections on channel addresses (from 'Fraud service reporting')

Data Captured:

The Fraud Service ingestion will capture the following data for use in scoring for channel addresses where it is then propagated to the Fraud Service Scoring module(s) for evaluation. In some cases, the 'channelType' will determine what data is available for processing. IP address channels and ANI will differ in what data is available for processing. The 'Fraud Service Scoring' will process only what it can based on the channel type identified:

```
{
    "accounts": [{
        "accountDisplay": "string",
        "accountHash": "string",
        "authValue": " string",
        "contextData": [{
            "name": "string",
            "value": "string"
        }],
        "countFailedAuth": 0
    }],
    "actionTaken": "string",
    "aniIIDigits": 0,
    "appLogId": "string",
    "appName": "string",
    "application": "string",
    "callCompletionCode": "string",
    "channel": "string",
    "channelAddress": "string",
    "customerId": "string",
    "division": "string",
    "dnis": "string",
    "duration": 0,
    "exitPoint": "string",
    "ipAddress": "string",
    "organization": "string",
    "sipHeader": [{
        "field": "string",
        "value": "string"
    }],
    "startTime": "2018-09-19T10:05:00",
    "voiceBiometrics": [{
        "event": "string",
        "personId": "string",
        "personType": "string",
        "score": 0,
        "voiceprintId": "string"}]
```

Additional context can be any further details about the account in a Payment Card Industry Data Security Standard (PCI) compliant format.

Application Intents

The following high-level application intents are supported.
Active Call Analysis:
Channel addresses that are in the active or connected STATE can be analyzed during a call or session e.g. on-the-fly assessment. Events received via the ingress can be quickly processed and if identified as a suspect and a notification can be returned to the originating event producer allowing:
  the application to perform special processing, knowledge-based authentication (KBA), routing, and/or call rejection, etc.
  forwarded to the 'score topic' for immediate viewing on the Fraud UI dashboard. E.g. a live view while the call/session is active/ongoing. The Fraud UI dashboard may provide the ability to stop the call/session.
Post Call Analysis:
Call analysis after a call/session completes resulting in a report for a given channel address showing threat level. Reports on a channel address can be analyzed over a 30 day, 7 day, current month, or other arbitrary (random) time period. 3rd Party Supplemental Data (application extensions):
Supplemental data may be supplied to further access threat patterns/behaviors. By using the ANI, IP address or other supplied data we can capture additional useful information from third parties that can then be used in a series of rules. Data available but not limited to are as follows:
  Public Switched Telephone Network (PSTN)
  Line Type
  Carrier
  Location
  Name
  Business/Person
  IP:
  Continent
  Country
  Country Code
  Country CF
  Region
  State
  State Code
  State CF
  DMA—Designated Marketing Area
  MSA—Metropolitan Statistical Area
  City
  Postal Code
  Time zone: GMT-05:00
  Area Code: 315
  City CF
  Latitude
  Longitude: −76.5374

Scoring (ANI and IP)

The 'Fraud Service Scoring' Module(s) can score as many data points based on the channel type producing a report for a given channel address. This process is dependent on the channel address and the information it provides. The following types of scoring are used.

Threat Scoring (external blacklist)—Conditional Processing Based on 3rd party ANI blacklist and IP blacklist requests.
Threat Scoring (internal blacklist/whitelist)—Conditional Processing
Based on application, customer, and local ANI blacklist and IP blacklist. This score is combined with the threat scoring above. It is assumed that local scoring may identify fraudulent channel addresses that are not registered with third parties or vice versa. Therefore, a check of local application blacklists is required.
Behavior Scoring (counts)—Standard Deviation and Weighted Averages. Each of the following has 3 threshold levels most are applicable to multiple channel address types.
  multiple accounts accessed
  total call/access attempts
  short calls—based on a short call qualifier
  failed authentication/account locks
  re-pin/password reset requests
  Multiple Social Security Numbers (SSN)/emails accessed
  Exit Points (min of 5) (where does a channel address exit?)
  Situational Scoring—Weighted Averages
The following data can be capture and use for scoring: Caller ID, IP whois, Autonomous
System Number (ASN) lookup, Geographic (GEO) IP look up, white pages lookup. These scores may be used individually or combined in any number or combinations to increase specificity and sensitivity:
  Line-type
  Device Type
  Browser User agent/Device Signature/Accept language Hypertext Transfer
  Protocol (HTTP) headers
  Location
  Carrier verification
  Address Verification (if available)
  ASN Verification
  Billing Address
  Distance between GEO IP and Address
  Country
  Country Discrepancy Billing country, Shipping country, International
  Identification Number (IIN) country, and GEO IP Country
  Email Address
  Email Domain Email Address Age Email Trace
  IIN Region mismatch or specific risk for IIN IP Tenure—Tenure of customer on IP address
  Phone Number
  Address Distance Address and IP address location
  Time of Day Local Time of day in the IP address location
  Qualifiers are used/configured for these and is dependent on how an individual app is configured. For example, email addresses that are greater than 1 year old might be assigned a risk level of 10 and one that is a week old assigned a risk level of 85. These values are then used in a weighted averages calculation as defined later in this disclosure. For more broad categories like countries, a simple listing of suspect countries would be assigned a risk level of 85 and all other a default value of 20.
Reputation Scoring—Weighted Averages New channel addresses tend to be riskier than those known. A channel address is considered new if we haven't seen it in the last 90/180 days. An age qualifier is used to determine either a single threat level or multiple e.g., Not seen in 180 days equates to a threat level=75, not seen in 90 days equates to a medium threat=50, and finally not seen in 45 days equates to minimum threat 30.

Data Processing

There are three approaches considered for this system. The system employs conditional processing, standard deviation in an unsupervised learning model, and weighted averages. Behaviors, situation and reputation are all processed via weighted averages. Behaviors are qualified via a calculation that determines how far they are from the mean. All others are qualified by configuration, in some cases by an analyst. Scores from all are used in combination scoring, which generates an overall risk score that may be used to determination whether a report on the channel address is propagated to the fraud report service and the dashboard for further action and review in real-time.

Combination scores are calculated by the combination of threat scoring, behavioral scoring, situational scoring, and reputation scores. The combination of scores is entirely configurable and interchangeable and often dependent on the channel address type and what data is available from it. Before scores are calculated, modus ponens with forward chaining is used. Due to the use of multiple channel address types and the availability of data, the need for a diverse rule set is required. To start the process, one or many conditionals might be used, for example a basic set of modus ponen rules might look as follows.

```
For channelAddress_A
If (whitelisted) {end processing}
If (blacklisted) {end processing; notify security team;}
If (email address age < 1 week) AND (ASN location = Russia) AND
(Time of day = 2am) {
    Continue processing;
}
```

If conditional process doesn't redirect the process, the scoring process is started. Behavior counts are processed via weighted averages of the percent deviation from the mean or expected behavior. All others (situational and reputation) are calculated using weighted averages. Rules can be added and included in processing as new data becomes available via configuration step.

The scoring engine starts with the data and reasons its way to the answer. It can do this by combining one or many rules weighting the outcomes of each and concluding a risk level. The effect of this method is an ability to add and apply combinations of rule sets to generate the likelihood of fraud. It also allows for easy addition of new rules as the fraudsters apply new attack vectors. For a given channel address there can be 1 to N rule combinations that when combined provide a Fraud risk score.

Taking the data input, using modus ponens in a forward chaining algorithm, analyzing via standard deviation and applying weighted thresholds provides a unique, single solution to assess fraud on multiple channels in a way that allows for the addition of new rules or modification of those rules. Based on the channel type and combination of rules, outputs can be combined and weighted to provide the likelihood of Fraud. As a data driven approach, the addition of data can allow for better sensitivity and specificity. Being able to configure the solution provides added flexibility to adjust in dynamic environment where inputs change based on the domain.

Weighted Average of a Deviation from the Expected

As we discussed prior, using standard deviation is one way to look at the data and determine if a behavior qualifies as an outlier. Standard deviation allows us the ability to visualize the domain and even make decisions about processing. The mean and average deviation is used to calculate the percent of deviation that a behavior is from the expected (mean). The percent deviation from the mean can be applied to a weighted average calculation to come up with an overall average or likelihood that a call is risky.

Calculating Percent Deviation

Knowing the mean, we can calculate the percent deviation of a behavior from the expected. Percent deviation measures the distance in percentage of a data point from the mean. We start by calculating the distance of our behavior count from the mean:

the distance, D, of a data point equal to the absolute value of the data point's value, d, minus the mean, m:

$$D=|d-m|.$$

Percent Deviation from the Mean $$Pd=|d-m|/m)*100$$

The mean and deviation are used to find the percent deviation. Dividing the deviation by the mean, then multiply by 100, will show how far in terms of percentage a point is from the expected. Next, for each count we take and apply a weighted average across the data as such.

Weighted Average of all Percent Deviations:

$$\text{Weight Avg}_x = w_1 x_1 + w_2 x_2 \ldots w_n x_n$$

$x$=Percent Deviation

The weighted average we take each behavior and it's percent deviation and apply a weight to it. The combined cumulative weight should be 1. So, for each value of x a weight is assigned.

A Simple Example

In this simple example, we use a call volume and accounts accessed that look to be outliers while both the reputation and situation scores are lower (as configured by the application).

```
//********** BEHAVIOR - CALL VOLUMES **********
34, 23, 5, 12 ,40, 19, 22, 4
M 20
D = |40 - 20| = 20
Percent deviation:
20/20 * 100 = 100%
//********** BEHAVIOR - ACCOUNTS ACCESSED **********
3, 60, 35, 28, 16, 32, 9, 21,
M = 25.5
D = |60 - 25.5| = 34.5
Percent Deviation
34.5/25.5 = 135%
//********** REPUTATION **********
```

-continued

```
Channel address not seen in 45 days.
30
//********** SITUATIONAL **********
Country = US.
20
Carrier = Verizon
------------------------------------------------------------------------
We configure the weights for each based on an analysis of the application usage.
Weighted Average
BEHAVIOR CALL VOLUMES =            1.0       |    30%
BEHAVIOR ACCOUNTS ACCESSED =       135       |    40%
SITUATIONAL - COUNTRY =            0.2       |    10%
SITUATIONAL - CARRIER =            0.3       |    20%
W = 1.0*03 + 1.35*0.4 + 0.2*0.1 + 0.3*0.2
W = 0.3 + .54 + .02 + .06
Weighted Average = .92
```

Figure 3:
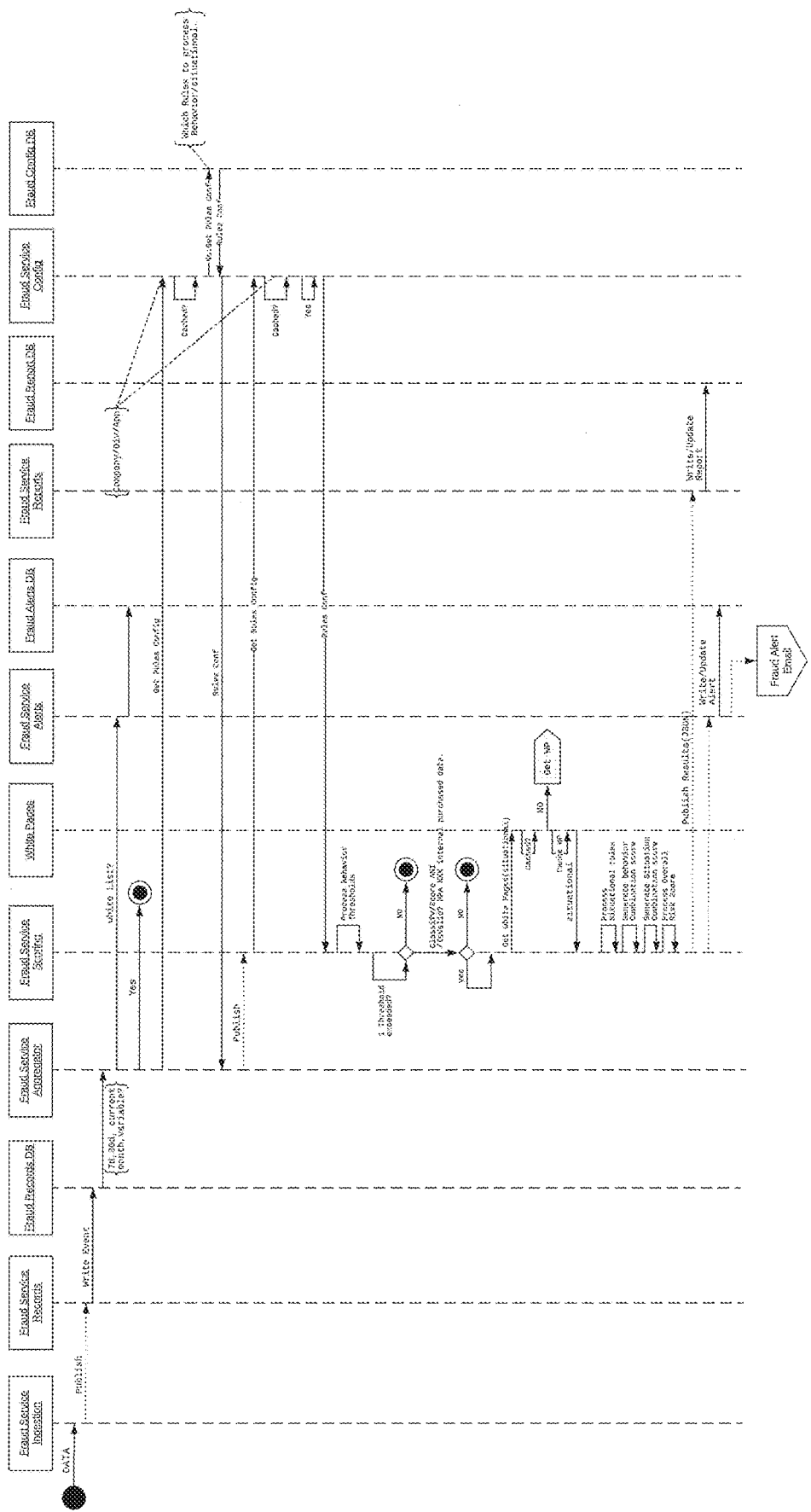
FIG. 3 illustrates an exemplary system sequence for rules processing according to principles described herein.
Figure 4:
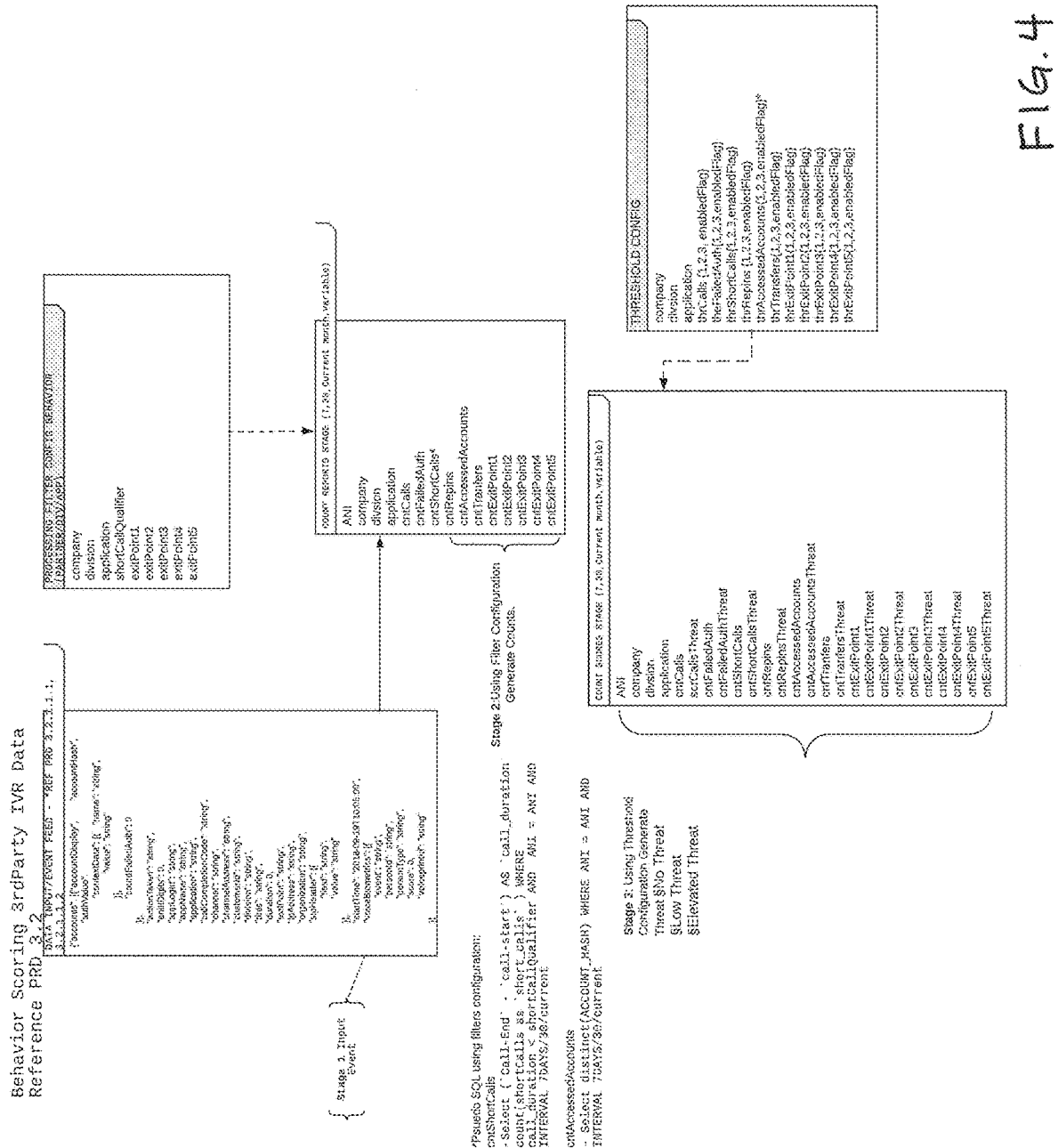
FIG. 4 illustrates representative behavior scoring of third-party interactive voice response (IVR) data according to principles described herein.
Figure 5:
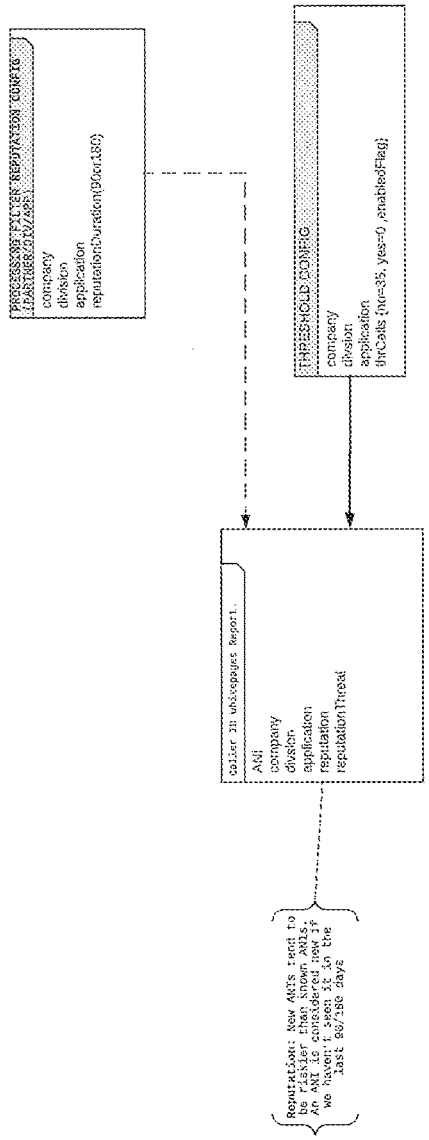
FIG. 5 illustrates reputation scoring of third-party interactive voice response (IVR) data according to principles described herein.
Figure 6:
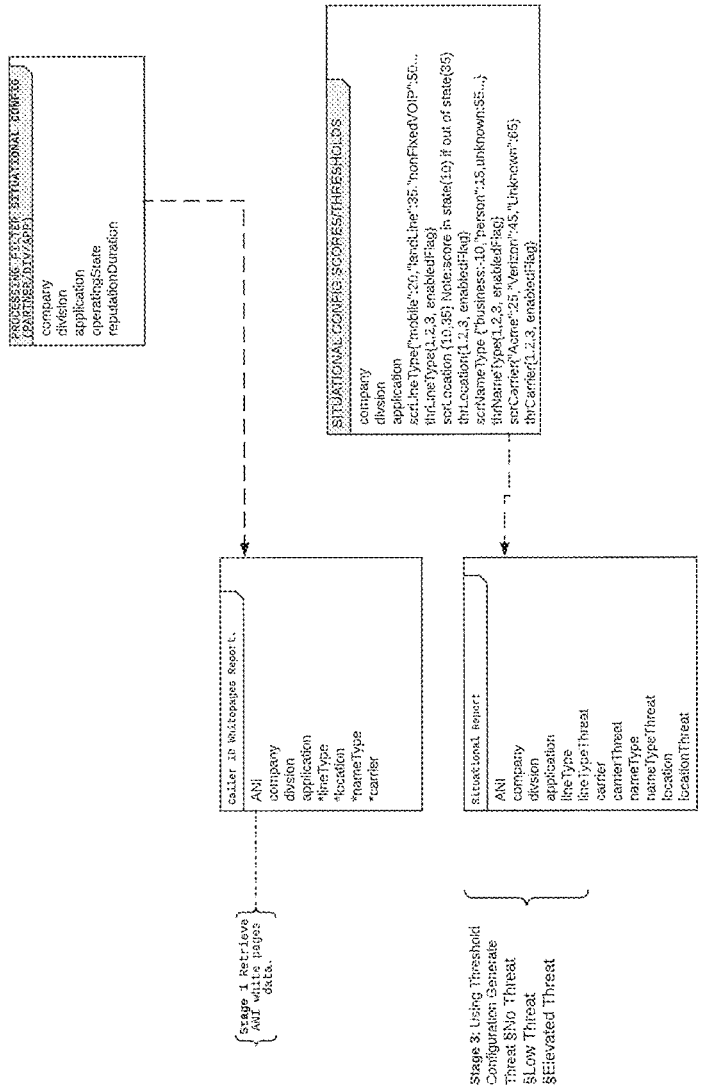
FIG. 6 illustrates situational scoring of third-party interactive voice response (IVR) data according to principles described herein.
Figure 7:
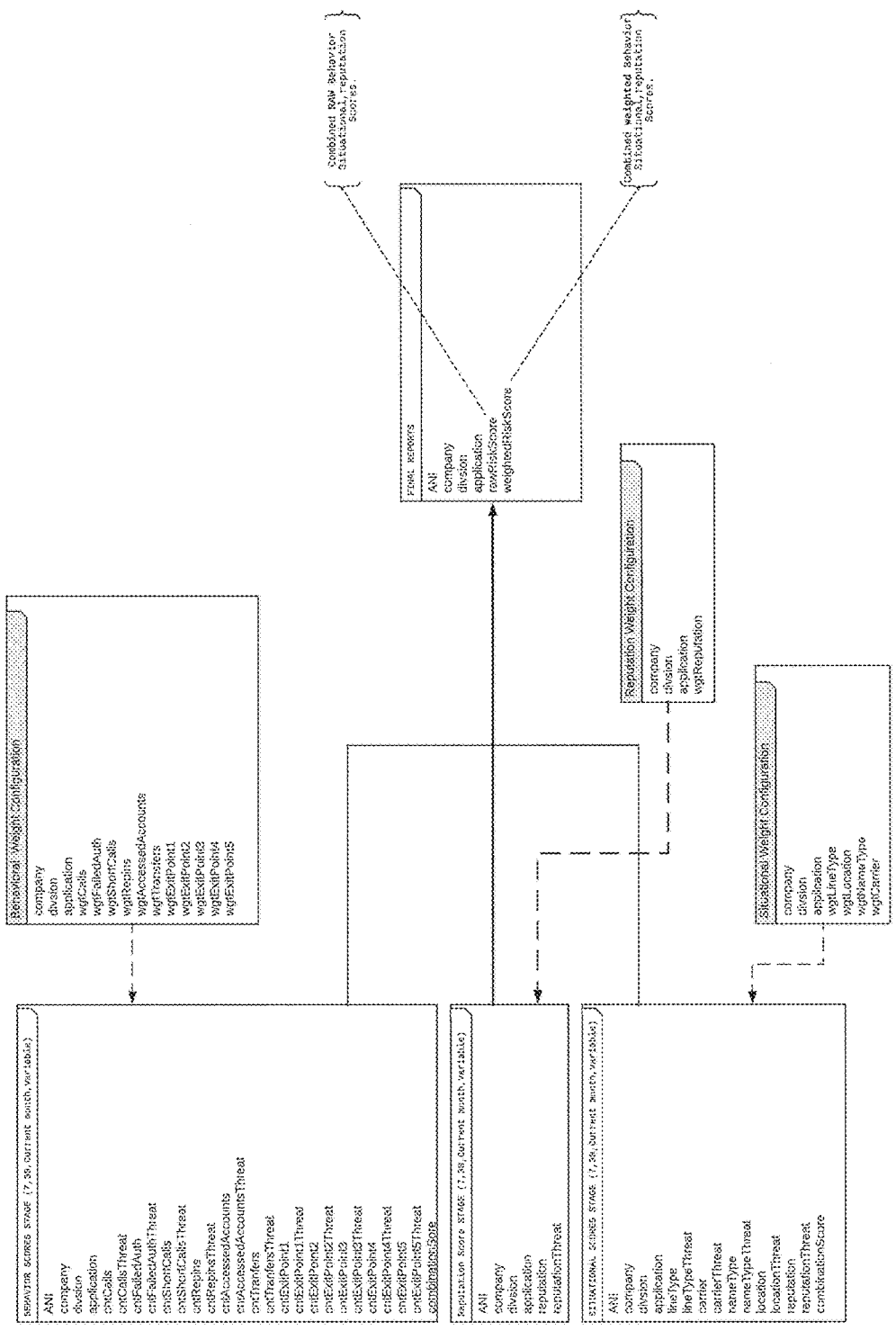
FIG. 7 illustrates a representative final report considering combined behavior and situational scoring according to principles described herein.
Figure 8:
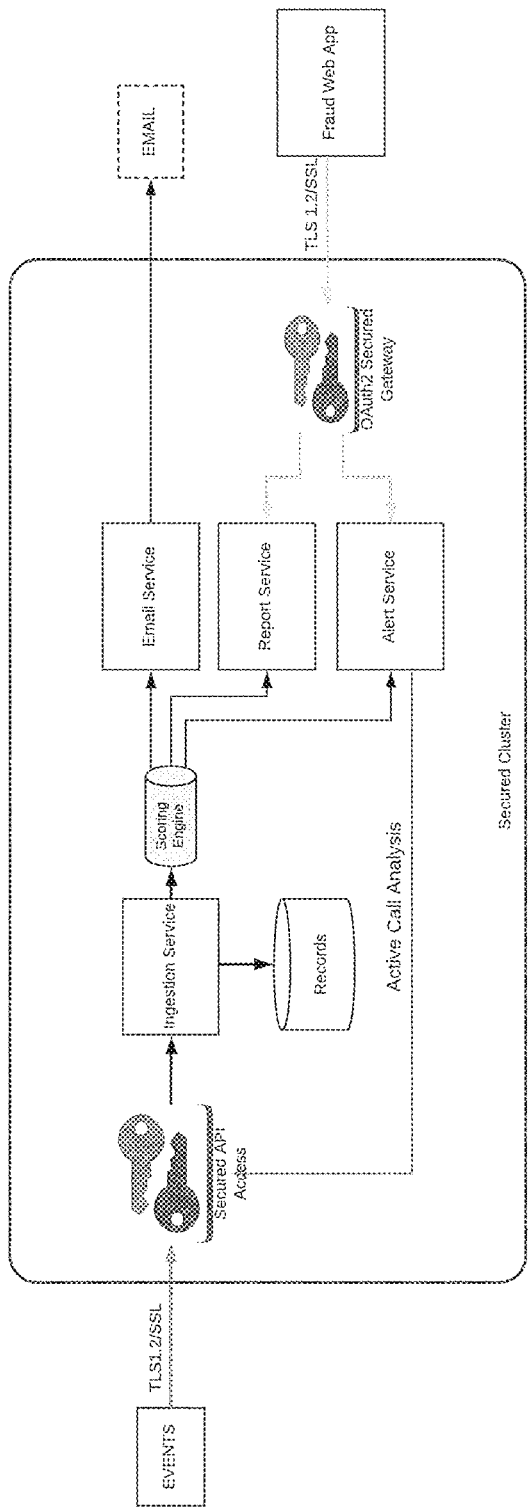
FIG. 8 illustrates a representative secured cluster according to principles described herein.
Figure 9:
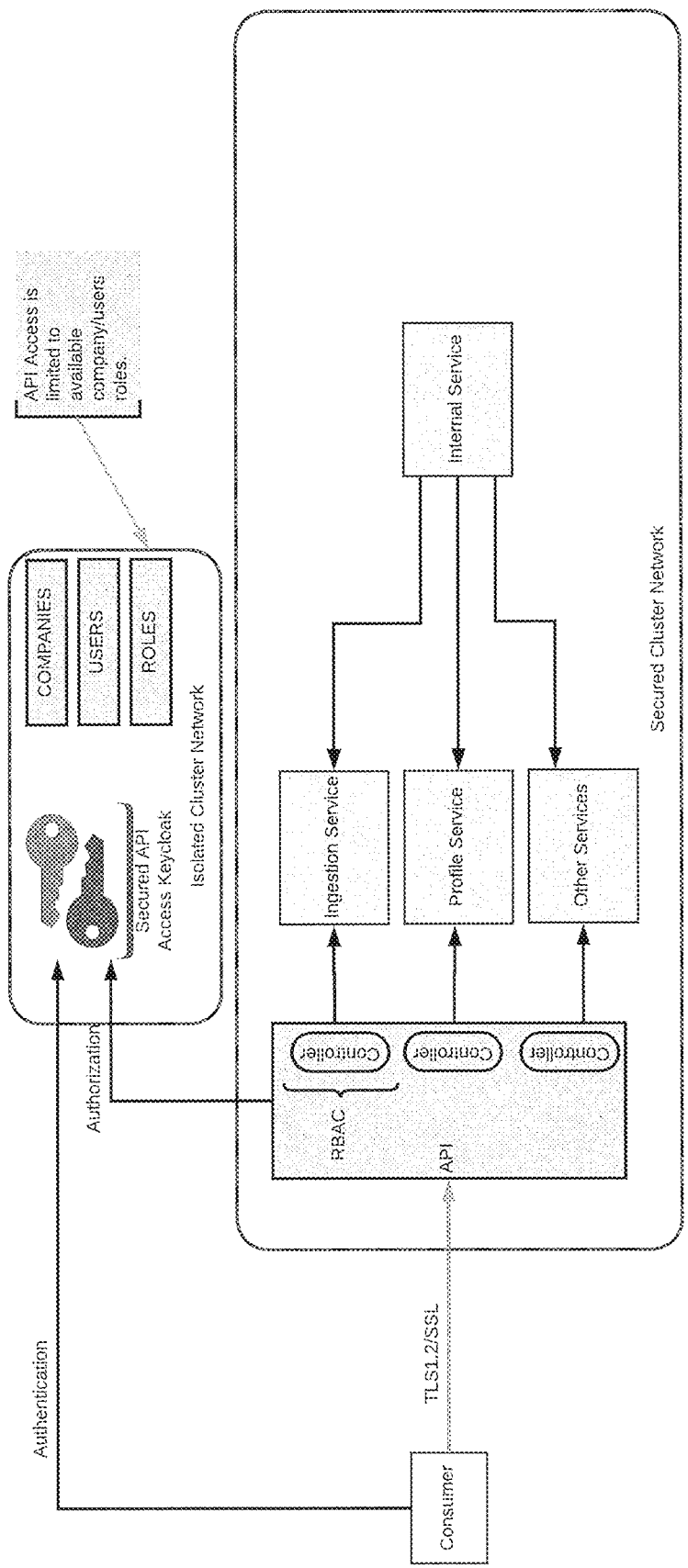
FIG. 9 illustrates a representative cluster network according to principles described herein.
Figure 10:
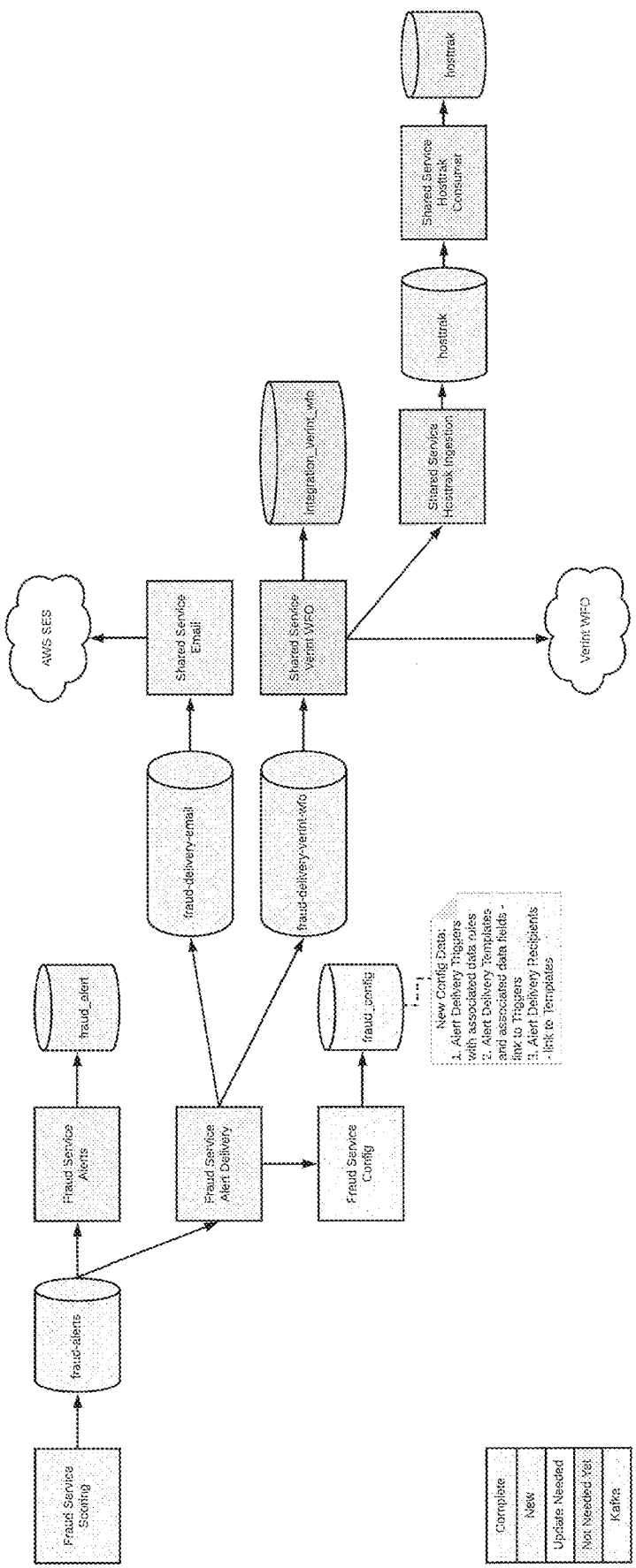
FIG. 10 illustrates another representative architecture according to principles described herein.

FIG. 3 illustrates an exemplary system sequence for rules processing according to principles described herein. FIG. 4 illustrates representative behavior scoring of third-party interactive voice response (IVR) data according to principles described herein. FIG. 5 illustrates reputation scoring of third-party interactive voice response (IVR) data according to principles described herein. FIG. 6 illustrates situational scoring of third-party interactive voice response (IVR) data according to principles described herein. FIG. 7 illustrates a representative final report considering combined behavior and situational scoring according to principles described herein. FIG. 8 illustrates a representative secured cluster according to principles described herein. FIG. 9 illustrates a representative cluster network according to principles described herein. FIG. 10 illustrates another representative architecture according to principles described herein.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of detecting fraud in a client contact system, comprising:
receiving a contact from a user, the contact corresponding to event data, the event data including at least one of a channel address and an identifier;
upon determining that the channel address is not whitelisted, aggregating records to score the event data by checking the event data against criteria to determine a risk associated with the event data, wherein the criteria comprises behavior criterion, situation criterion and reputation criterion, where the criteria are based on the aggregated records;
wherein the behavior criterion is indicative of behavior of the user with respect to the client contact system over a predetermined period of time;
wherein the situation criteria is indicative of network via which the contact is received; and
wherein the reputation criterion is indicative of the trustworthiness of the channel from via which the contact is received; and
outputting a score based on the behavior criterion, the situation criterion and the reputation criterion and passing the contact from the user to the client contact system when the score is within a predetermined range; and
updating the aggregated records according to the behavior criterion, the situation criterion and the reputation criterion for the channel address and identifier; and
allowing the contact corresponding to event data to proceed without further verification.

2. The method of claim 1, wherein the reputation criterion includes a historical account of how the user has used the client contact system previously.

3. The method of claim 1, further comprising forwarding the event data to a fraud scoring service upon determining that the behavior criterion associated with the event data indicates that the user has interacted with the client contact system maliciously previously.

4. The method of claim 1, wherein the situational criterion includes at least one of origination location of the user and the time of day of the contact.

5. The method of claim 4, further comprising forwarding the event data to a fraud scoring service upon determining that the origination location of the user is a suspect origin.

6. The method of claim 1, wherein the behavior criterion includes count volume associated with the user.

7. The method of claim 1, wherein the behavior criterion includes how many accounts are associated with the identifier.

8. The method of claim 1, wherein the behavior criterion includes a number of times a user has accessed the client contact system over a predetermined time period.

9. The method of claim 1, wherein the behavior criterion is determined by calculating a statistical standard deviation over a predetermined period of time for a typical contact with the client contact system and determining whether the event data falls outside the statistical standard deviation.

10. The method of claim 1, wherein the identifier comprises one of an ANI, an IP address, a SIP address and an email address.

11. The method of claim 1, further comprising publishing suspect events to a series of reporters.

12. The method of claim 1, further comprising forwarding the event data to a fraud scoring service upon determining that any of the behavior criterion, the situation criterion and the reputation criterion are satisfied.

13. The method of claim 1, further comprising collecting additional data related to the user or the context of the contact and determining upon determining that further analysis steps should be performed based on the collected additional data.

14. The method of claim 1, further comprising checking and adjusting a format of the event data into a standard format upon determining that the format of the event data is not in the standard format.

15. The method of claim 1, further comprising partitioning data related to a plurality of contacts using a unique has key generated based on channel type, channel address and data source.

16. The method of claim 1, further comprising sorting event data by date.

* * * * *